United States Patent
Dohm et al.

(10) Patent No.: US 6,575,682 B1
(45) Date of Patent: Jun. 10, 2003

(54) QUARTER TURN FASTENER

(75) Inventors: Stephen R. Dohm, Schaumburg, IL (US); Jeffrey D. Anderson, South Elgin, IL (US); Jennifer L. Crumrine, Streamwood, IL (US); James M. Van Ingen, Algonquin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/716,144

(22) Filed: Nov. 16, 2000

(51) Int. Cl.[7] .................................................. F16B 21/02
(52) U.S. Cl. ........................ 411/553; 411/349; 411/350; 411/84
(58) Field of Search ........................ 411/349, 549–553, 411/84, 85; 292/59, 241

(56) References Cited

U.S. PATENT DOCUMENTS

| 890,285 A | * | 6/1908 | Krantz | .................... 411/84 |
| 2,580,319 A | | 12/1951 | Poupitch | |
| 2,670,513 A | | 3/1954 | Schlueter | |
| 2,676,680 A | * | 4/1954 | Kindorf | .................... 411/84 |
| 2,931,471 A | * | 4/1960 | Howard | |
| 3,123,389 A | | 3/1964 | Biesecker | |
| 3,472,542 A | * | 10/1969 | Hart | |
| 4,145,862 A | | 3/1979 | Sygnator | |
| 4,262,394 A | * | 4/1981 | Wright | |
| 4,545,697 A | * | 10/1985 | Verdenne | |
| 4,936,066 A | * | 6/1990 | Rutsche | |
| 5,142,834 A | * | 9/1992 | Laclave | |
| 5,897,278 A | | 4/1999 | Frattarola | |

FOREIGN PATENT DOCUMENTS

JP   3-39918   * 10/1992

* cited by examiner

*Primary Examiner*—Flemming Saether
(74) *Attorney, Agent, or Firm*—Mark W. Croll; Paul F. Donovan

(57) ABSTRACT

A quarter turn fastener, for securing a plurality of members together, includes a blade member which has upturned corner portions defining sharp points for bitingly engaging the undersurface of the lowermost one of the plurality of members so as to prevent retrograde movement of the quarter turn fastener from the locked state back to the unlocked state. A quarter turn fastener assembly also comprises a stop member for engaging wall portions of another one of the members to be secured together such that rotation of the quarter turn fastener is limited to 90° arcuate extents either from the unlocked state to the locked state or from the locked state to the unlocked state.

26 Claims, 5 Drawing Sheets

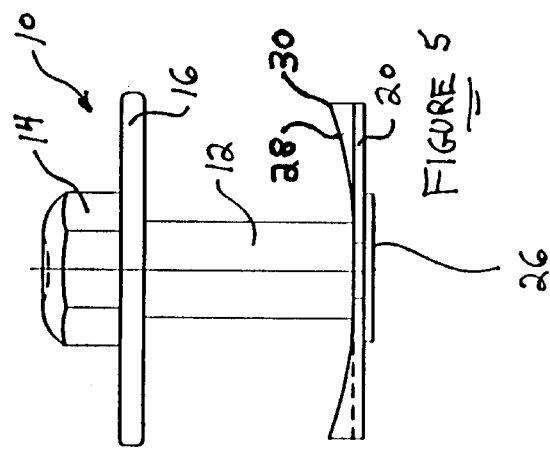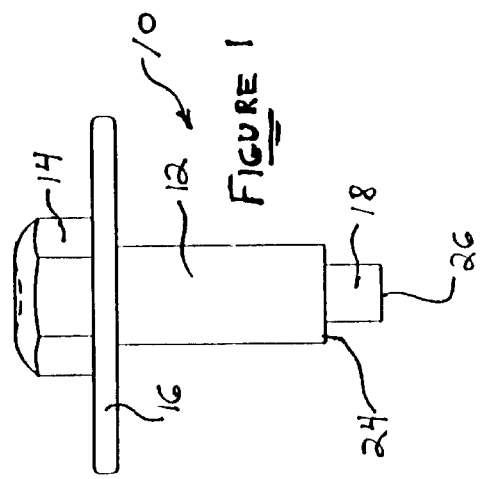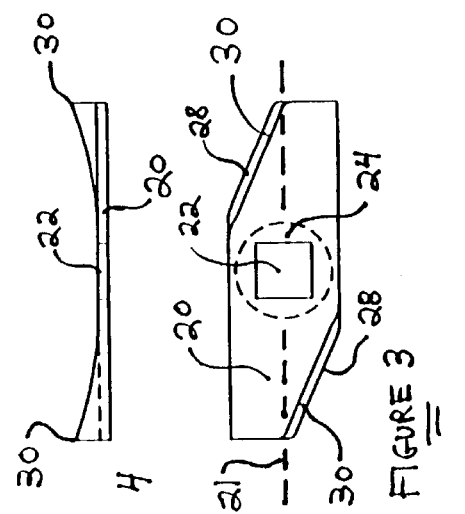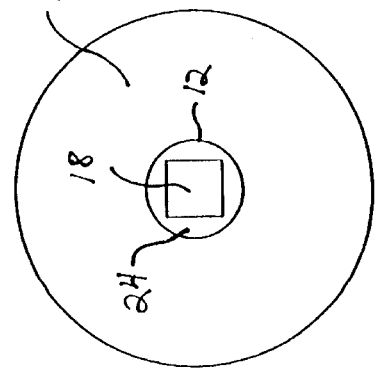

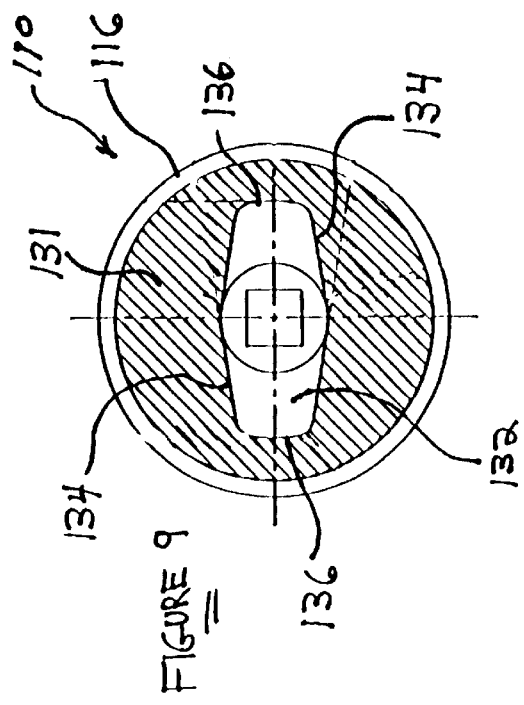
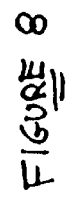
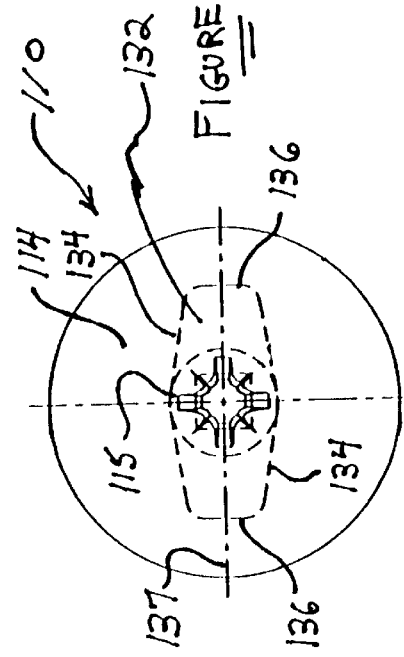
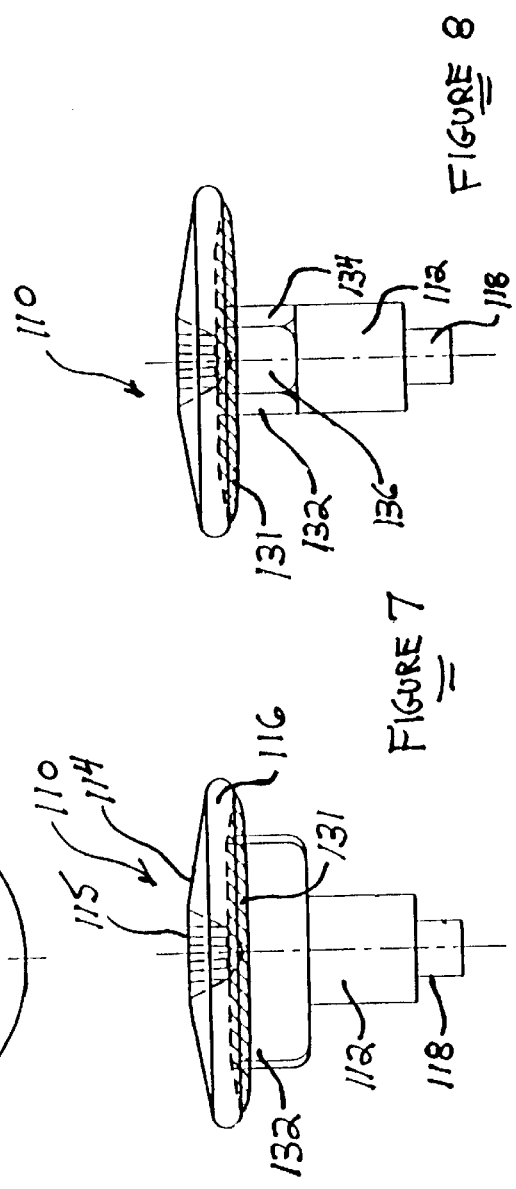

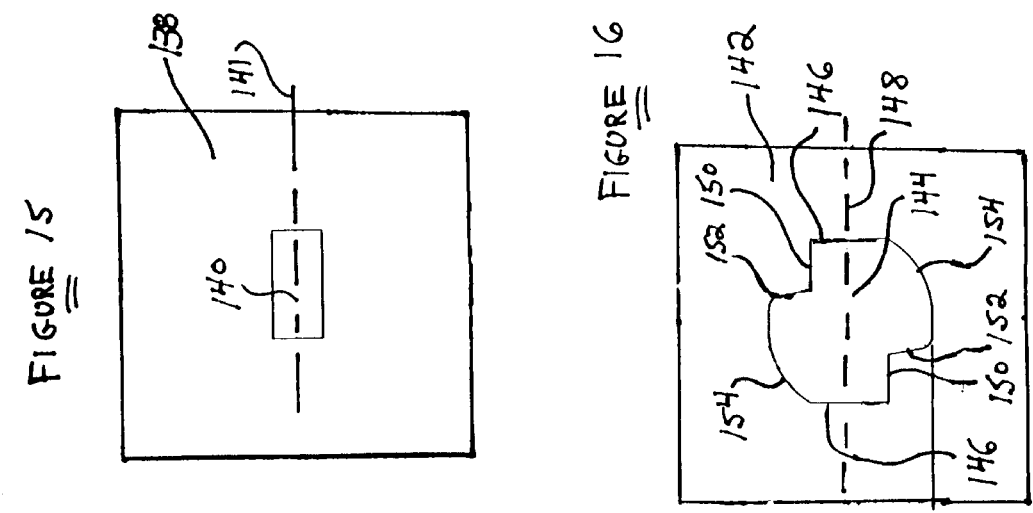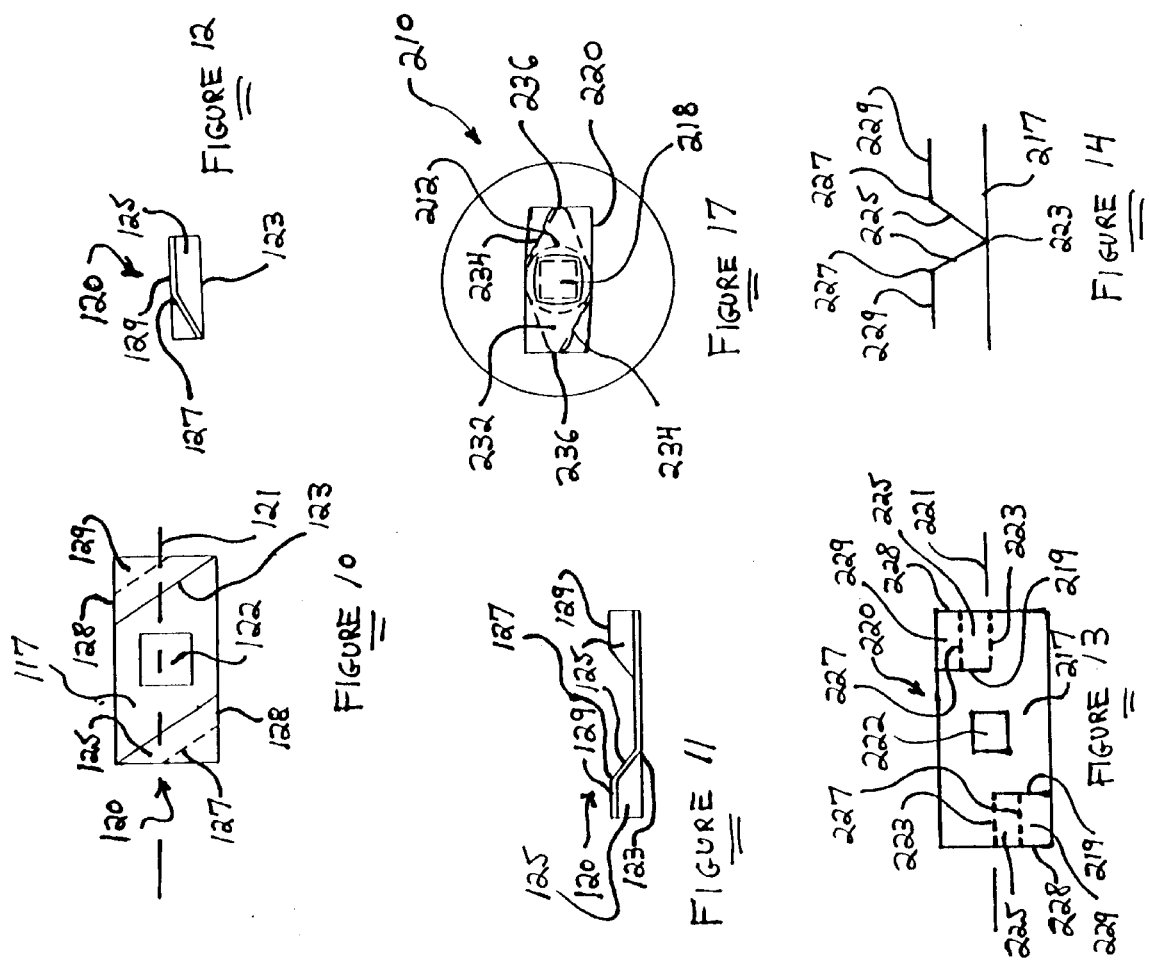

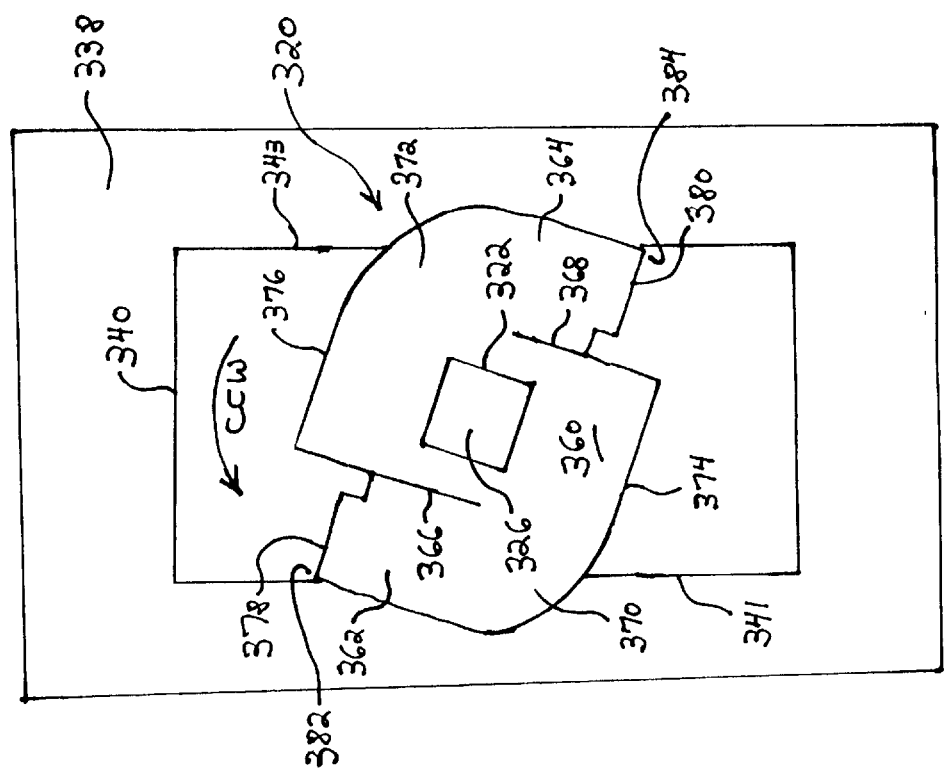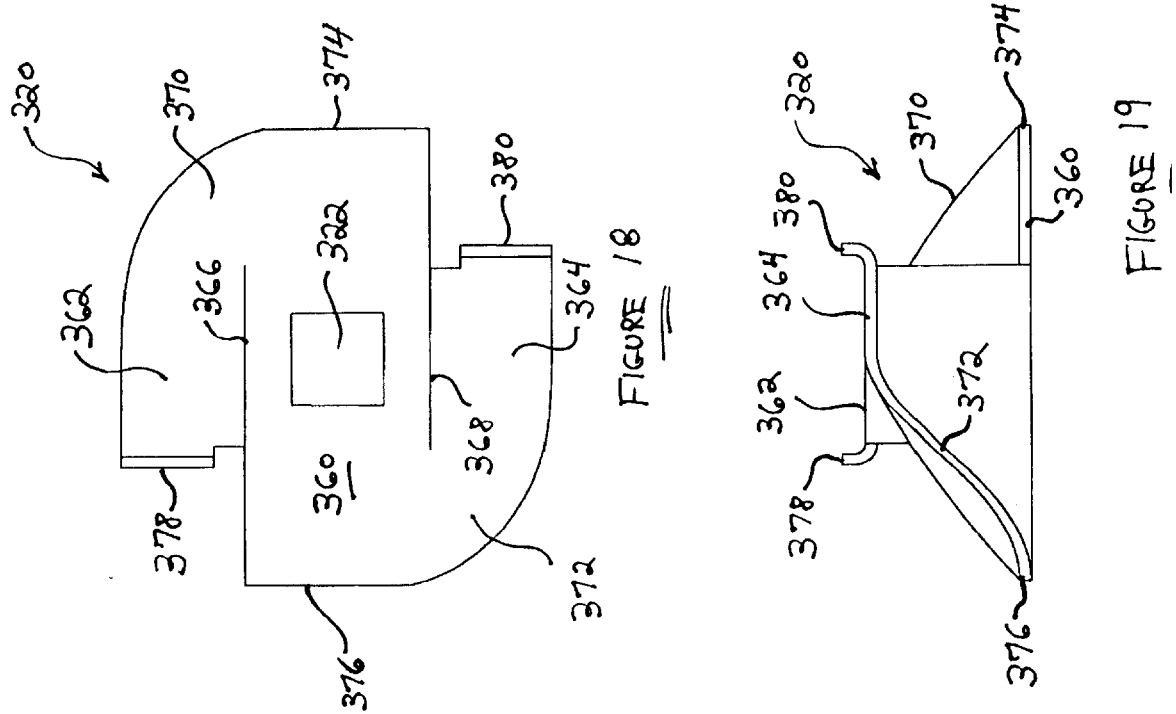

QUARTER TURN FASTENER

FIELD OF THE INVENTION

The present invention relates generally to quarter turn fasteners, and more particularly to a new and improved quarter turn fastener for clamping together a plurality of panels, plates, disks, or the like, wherein enhanced clamping loading is achieved, and wherein further, the quarter turn fastener can only be rotated in a first direction so as to be disposed its locked or engaged position or mode, the quarter turn fastener can only be rotated in the opposite direction so as to be disposed in its unlocked or released mode or position, and the quarter turn fastener cannot be rotated beyond 90° in either the locking or unlocking direction such that when the fastener is desired to be disposed in its locked or engaged position or mode, it is not inadvertently disposed or moved to its unlocked or released position or mode.

BACKGROUND OF THE INVENTION

Quarter turn fasteners are of course well known in the art for securing or clamping together a plurality of panels, plates, disks, and the like as a result of partial rotation of the fastener through means of an arcuate extent of, for example, 90°. The panels, plates, disks, or the like are conventionally clamped between a head member formed upon a first end portion of the fastener shank, and a protruding portion formed upon a second opposite end portion of the fastener shank. While such quarter turn fasteners have obviously been quite satisfactory and have been successfully employed by workmen in connection with innumerable fastening applications or operations, it is desired to improve the clamping loading and back-off resistance of such fasteners so as to effectively prevent disengagement of permanently installed fasteners under field use environmental conditions.

In addition, as is well known and as has been descrbied briefly hereinabove, such fasteners are conventionally installed at their locked position by rotating the same through means of an arcuate extent of 90° with respect to the initial insertion position of the fastener with respect to the panels, plates, disks, or the like with which the fasteners are operably being used. However, in accordance with the construction and structure of such conventional quarter turn fasteners, the fasteners are not effectively prevented from being rotated further in the same installation rotational direction and may in fact be rotated further in the same installation rotational direction beyond the 90° locked position whereby the fasteners may be inadvertently moved, in effect, back to their unlocked or released positions such that the panels, plates, disks, or the like, are not in fact reliably or safely secured or clamped together.

A need in the art therefore exists for a new and improved quarter turn fastener wherein enhanced clamping loading is achieved, and wherein further, the quarter turn fastener can only be rotated in a first direction so as to be disposed its locked or engaged position or mode, the quarter turn fastener can only be rotated in the opposite direction so as to be disposed in its unlocked or released mode or position, and the quarter turn fastener cannot be rotated beyond 90° in either the locking or unlocking direction such that when the fastener is desired to be disposed in its locked or engaged position or mode, it is not inadvertently disposed or moved to its unlocked or released position or mode.

OBJECTS OF THE INVENTION

Accordingly, it is an object of the present invention to provide a new and improved quarter turn fastener.

Another object of the present invention is to provide a new and improved quarter turn fastener which effectively overcomes the various operational disadvantages and drawbacks characteristic of prior art or conventional quarter turn fasteners.

An additional object of the present invention is to provide a new and improved quarter turn fastener which comprises specific structure wherein enhanced clamping loading is able to be achieved in connection with those fasteners which are to be permanently installed within particular assemblies.

A further object of the present invention is to provide a new and improved quarter turn fastener wherein the quarter turn fastener can only be rotated in a first direction so as to be disposed its locked or engaged position or mode, the quarter turn fastener can only be rotated in the opposite direction so as to be disposed in its unlocked or released mode or position, and the quarter turn fastener cannot be rotated beyond 90° in either one of the locking or unlocking directions such that when the fastener is desired to be disposed in its locked or engaged position or mode, it cannot inadvertently be disposed or moved to its unlocked or released position or mode.

SUMMARY OF THE INVENTION

The foregoing and other objectives are achieved in accordance with the teachings and principles of the present invention through the provision of a new and improved quarter turn fastener wherein in accordance with a first feature or characteristic of the fastener, which is to be used in connection with relatively permanent fastener installations wherein the fasteners are not periodically or cyclically installed and removed, the same comprises a shaft, a head portion fixed upon a first end portion of the shaft, and a blade member fixed upon a second opposite end portion of the shaft. Opposite corner portions or regions of the blade member are bent upwardly such that the pointed upturned corner portions of the blade member bitingly engage the underside surface of, for example, a metal panel, plate, disk, or the like such that proper clamping loading is achieved. In addition, the biting engagement of the corner portions of the blade member with respect to the undersurface portion of the panel, plate, disk, or the like, effectively prevents disengagement of the fastener from the clamped plate, panel, or disk assembly under normal environmental vibrational conditions attendant usage of the fastener assembly within, for example, motorized applications.

In accordance with a second predominant feature or characteristic of the quarter turn fastener of the present invention, the shaft of the fastener is provided with a cam or stop member which is adapted to interact with a predeterminedly configured aperture defined within one of the panel, plate, or disk members. When the quarter turn fastener is rotated 90° from its unlocked or released state or position to the locked or engaged state or position, the cam or stop member not only effectively centers the shaft of the fastener with respect to the aperture defined within the panel, plate, or disk, but in addition, prevents further rotation of the quarter turn fastener beyond the 90° rotation already performed. In this manner, the quarter turn fastener cannot be rotated further. As a result of such structure, the quarter turn fastener cannot inadvertently again attain the released or unlocked state or position.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 6 is a top plan view of a second embodiment of a quarter turn fastener constructed in accordance with the principles and teachings of the present invention without its associated blade member attached thereto;

FIG. 7 is a side elevational view of the quarter turn fastener shown in FIG. 6;

FIG. 8 is an end elevational view of the quarter turn fastener shown in FIGS. 6 and 7;

FIG. 9 is a bottom plan view of the quarter turn fastener shown in FIGS. 6–8;

FIG. 10 is a top plan view similar to that of FIG. 3 showing, however, a second embodiment of a blade member constructed in accordance with the principles and teachings of the present invention and useable with either one of the quarter turn fasteners as shown, for example, in FIGS. 1 and 7;

FIG. 11 is a side elevation view of the blade member shown in FIG. 10;

FIG. 12 is an end elevation view of the blade member shown in FIG. 10;

FIG. 13 is a top plan view similar to that of FIG. 10 showing, however, a third embodiment of a blade member constructed in accordance with the principles and teachings of the present invention and useable with either one of the quarter turn fasteners as shown, for example, in FIGS. 1 and 7;

FIG. 14 is a side elevation view of the blade member shown in FIG. 13;

FIG. 15 is a plan view of, for example, a metal panel, plate, disk, or similar member, which may be one of the members to be clamped together by means of the quarter turn fastener assembly of the present invention, wherein the metal panel, plate, disk, or similar member has a predeterminedly configured aperture defined therein;

FIG. 16 is a plan view of, for example, a plastic panel, plate, disk, or similar member, which may be one of the other members to be clamped together by means of the quarter turn fastener assembly of the present invention, wherein the plastic panel, plate, disk, or similar member has a predeterminedly configured aperture defined therein;

FIG. 17 is a bottom plan view of a quarter turn fastener assembly having incorporated therein a third embodiment of a quarter turn fastener which may be used, for example, with any one of the blade members shown in FIGS. 3, 10, and 13, and which may be used to clamp together the metal and plastic members shown in FIGS. 15 and 16;

FIG. 18 is a top plan view similar to that of FIG. 13 showing, however, a fourth embodiment of a blade member constructed in accordance with the principles and teachings of the present invention and useable with, for example, the quarter turn fastener as shown in FIGS. 1 and 2;

FIG. 19 is a side elevational view of the fourth embodiment blade member shown in FIG. 18;

FIG. 20 is a bottom plan view of the blade member shown in FIGS. 18 and 19 as installed upon a pair of apertured metal and plastic plates or members secured together as a result of the quarter turn fastener and the blade member having been rotated approximately 65° in the counterclockwise direction;

DETAILED DESCRIPTION OF THE PREFERRED EMBODIMENT

Figure 22:
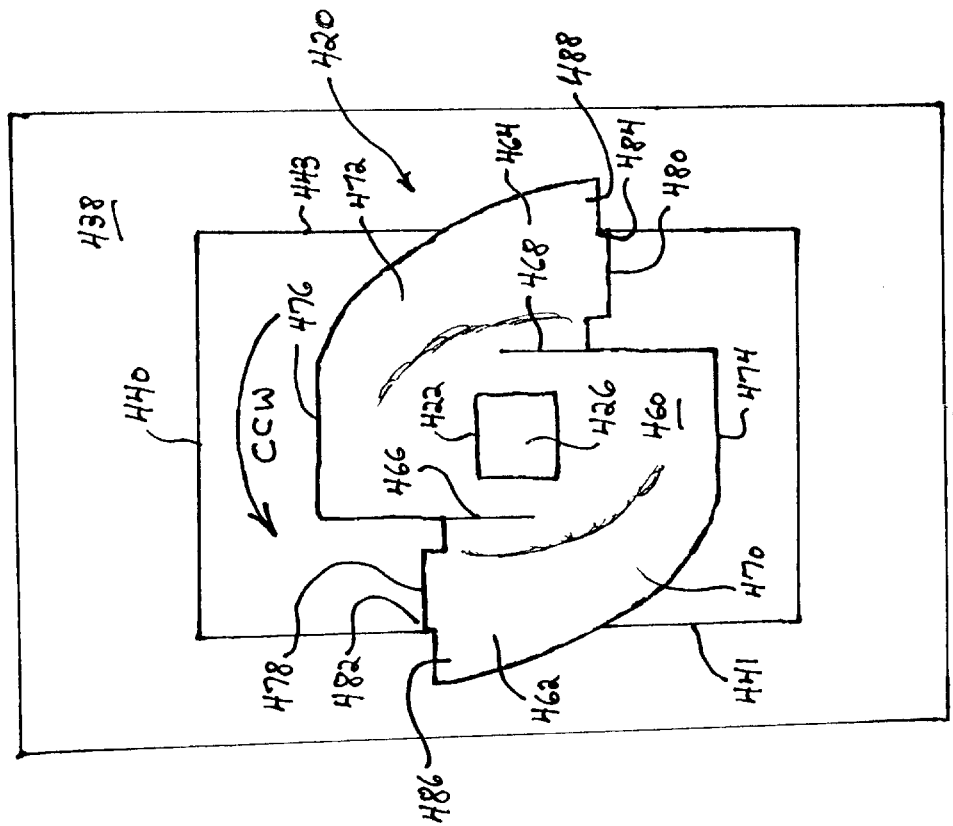
FIG. 22 is a bottom plan view of the blade member shown in FIG. 21 as installed upon a pair of apertured metal and plastic plates or members secured together when the quarter turn fastener and the blade member have been rotated approximately 90° in the counterclockwise direction.

Referring now to the drawings, and more particularly to FIGS. 1–5 thereof, a first embodiment of a quarter turn fastener, constructed in accordance with the principles and teachings of the present invention, is disclosed and is generally designated by the reference character 10. The quarter turn fastener 10 is seen to comprise a shaft portion 12 which, as best seen from FIG. 2, has a circular cross-sectional configuration. A head 14 is formed upon a first upper end of the shaft portion 12 of the quarter turn fastener 10, and a flange portion 16 is formed upon the quarter turn fastener 10 so as to annularly surround the upper end of the shaft portion 12 and therefore be effectively interposed between the head 14 and the upper end of the shaft portion 12. The head 14 is seen to have a substantially hexagonal or other similar geometrical configuration by means of which a suitable socket wrench, or other similar torquing tool, is able to rotate the quarter turn fastener 10 through means of an arcuate movement of 90° between either one of its locked or unlocked states, modes, or positions.

Figure 2:
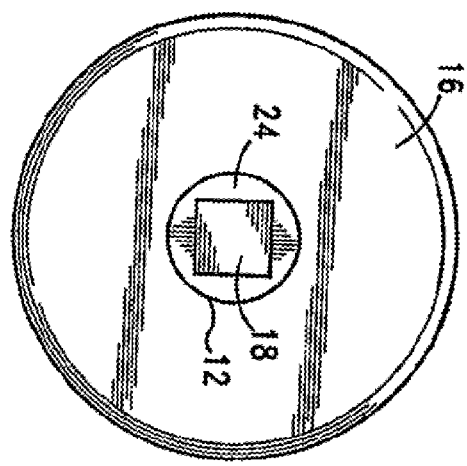
FIG. 2 is a bottom plan view of the quarter turn fastener shown in FIG. 1.

A tip portion 18 is formed upon a second lower end of the shaft portion 12, and as best seen from FIG. 2, the tip portion 18 has, for example, a substantially square-shaped cross-sectional configuration, although other non-circular geometrical configurations can likewise be used. The quarter turn fastener 10 further comprises a blade member 20 which is adapted to be fixedly mounted upon the lower end of the quarter turn fastener 10 so as to effectively operatively cooperate with the annular flange portion 16 in clamping together a plurality of panels, plates, disks, or the like. The blade member 20 has an initially substantially rectangular configuration and is provided with a centrally located aperture 22 which has a substantially square-shaped or other non-circular geometrical configuration that essentially matches that of the tip portion 18 such that the tip portion 18 can be inserted through the aperture 22 of the blade member 20. As a result of the substantially square-shaped tip portion 18 being formed upon the lower end of the shaft portion 12 with the side and diagonal dimensions of the tip portion 18 being less than the diametrical extent of the shaft portion 12, an annular shoulder portion 24 is defined between the lower end of the shaft portion and the upper end of the tip portion 18. Consequently, when the tip portion 18 is inserted through the aperture 22 of the blade member 20 and the blade member 20 is to be fixedly secured upon the lower end of the quarter turn fastener 10, the blade member 20 is moved relative to the tip portion 18 so as to abut the shoulder portion 24. Subsequently, a lowermost end region 26 of the tip portion 18 is deformed or upset, by any one of several well-known means, methods, or techniques, as best shown in FIG. 5, such that the blade member 20 is fixedly secured upon the quarter turn fastener 10.

Figure 3:
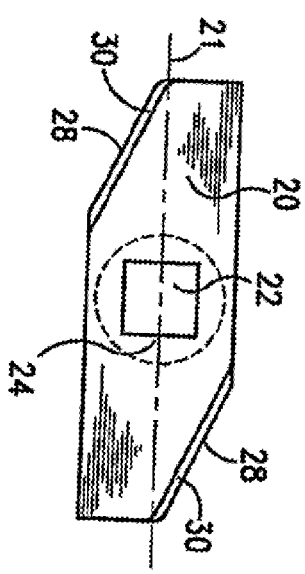
FIG. 3 is a top plan view of a first embodiment of a blade member, constructed in accordance with the teachings and principles of the present invention, as mounted upon but not yet fixedly attached to the quarter turn fastener shown in FIG. 1 so as to form a quarter turn fastener assembly to be used for clamping a plurality of panels, disks, plates, or similar members together.
Figure 4:
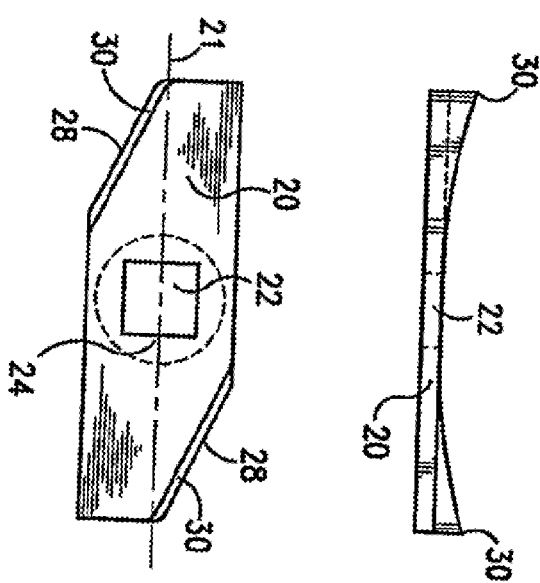
FIG. 4 is a side elevational view of the blade member shown in FIG. 3 before attachment to the quarter turn fastener shown in FIG. 1.
Figure 5:
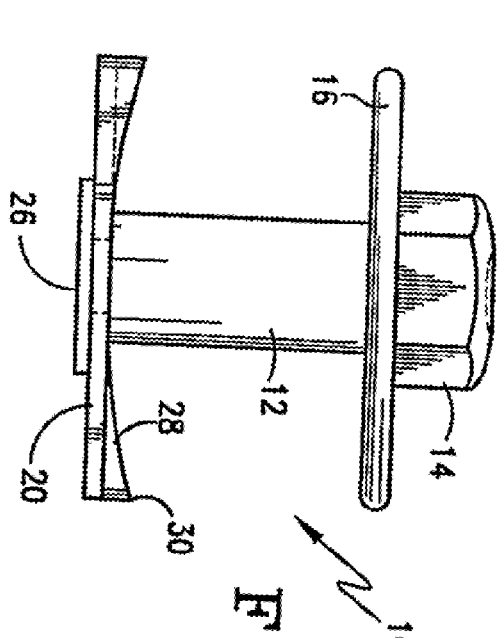
FIG. 5 is a side elevational view of a first embodiment of a quarter turn fastener assembly, constructed in accordance with the teachings and principles of the present invention, as formed from the quarter turn fastener of FIG. 1 and the blade member of FIG. 3 when the blade member of FIG. 3 is fixedly attached to the quarter turn fastener of FIG. 1.
Figure 21:
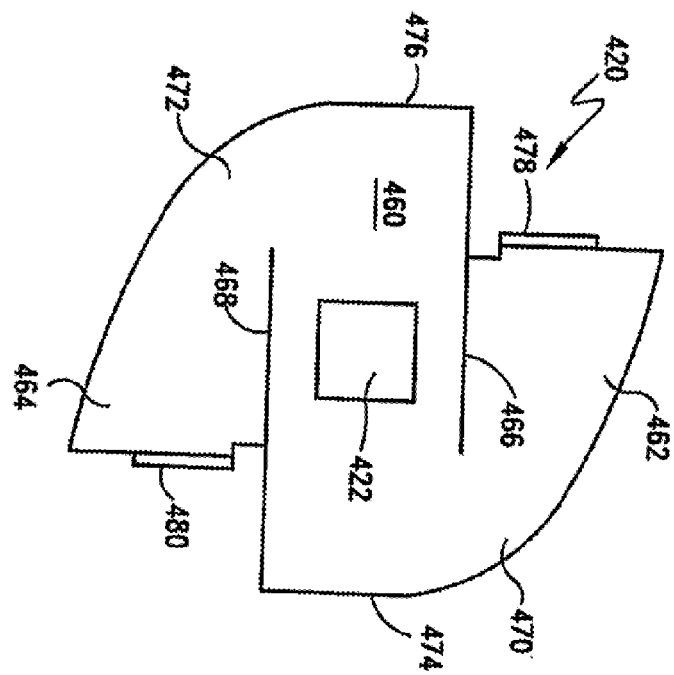
Figure 22:
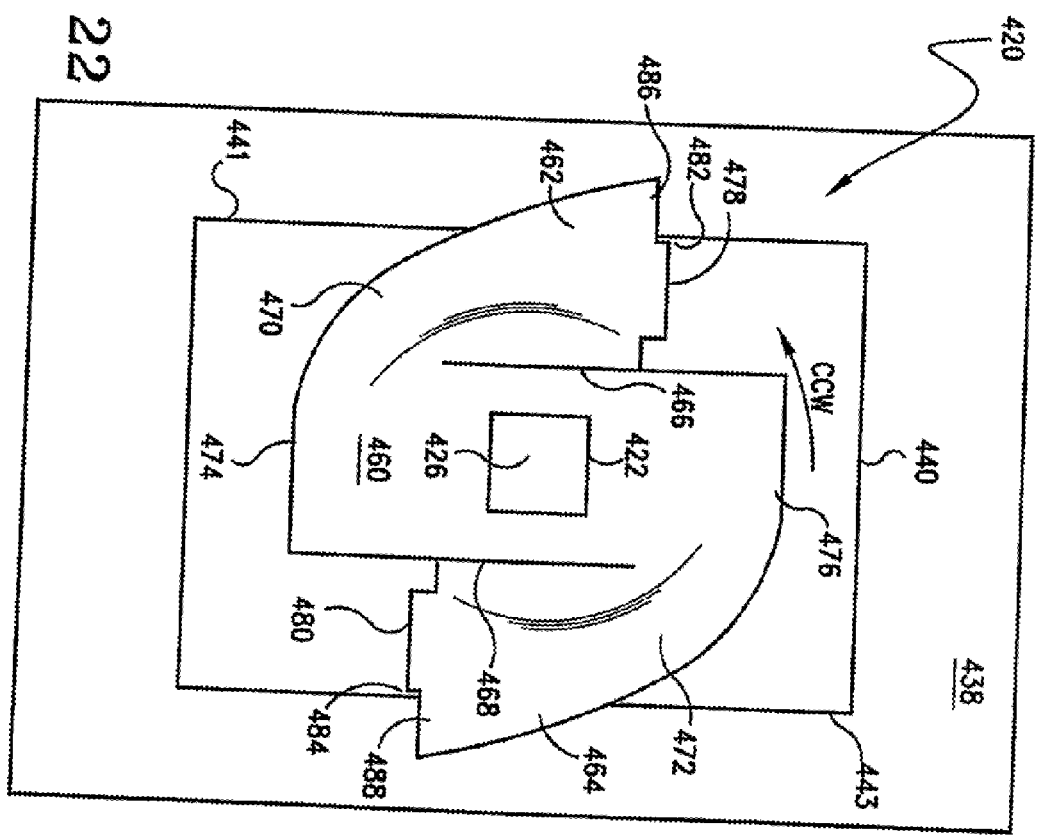

The blade member 20 is fabricated from suitable spring steel material, and as best appreciated from FIGS. 3–5, and in connection with the final formation of the blade member 20 for usage upon the quarter turn fastener 10, diagonally opposite corner regions 28 of the substantially rectangularly configured blade member 20 are bent upwardly such that corner regions 28 define upwardly sloped surfaces, and the actual corners or points of such oppositely disposed corner regions 28 define upwardly projecting spikes or the like 30 which are adapted to engage the underside of the lowermost one of the plurality of panels, plates, disks, or the like, to be clamped together. The provision of such sloped surfaces and upstanding or upwardly projecting spikes or points 30 upon the blade member 20 serves to effectively slightly flex the corner regions 28 and the points or spikes 30 of the blade member 20 away from the head 14 and thereby provide the blade member 20., and the quarter turn fastener 10, with an enhanced clamping load for maintaining the plurality of panels, plates, disks, or the like, securely fastened or clamped together when the quarter turn fastener 10 is mounted upon the panels, plates, disks, or the like. Such points or spikes 30 actually bite into the undersurface of the panel, plate, disk, or the like, with which the points or spikes 30 of the blade member 20 are engaged, when the quarter turn fastener 10 is rotated from the unlocked position or state to the locked position or state, and accordingly, such loaded interaction defined between the blade member 20 and the lowermost one of the panels, plates, disks, or the like, effectively prevents any retrograde movement or back-off of the quarter turn fastener 10 with respect to the panel, plate, disk, or the like, under, for example, operative vibrational environmental conditions.

It is to be particularly appreciated that in connection with this embodiment of the quarter turn fastener 10, and in view of the specific structure of the blade member 20, comprising, in particular, the provision of the points or spikes 30, that such quarter turn fastener 10 is adapted to be employed or used only in those situations or assemblies wherein the fasteners 10 are to be essentially permanently installed. In other words, such fasteners 10 are not designed to be repetitively or cyclically mounted upon and removed from its particular installation. The reason for this is that repetitive engagement or movement of the points or spikes 30 of the blade member 20 relative to the undersurface of the lowermost panel, plate, disk, or the like, with which the spikes or points 30 are engaged, would cause grooves or the like to be formed within such undersurface portion of the panel, plate, disk, or the like. As a result of the formation of such grooves or the like within the panel, plate, disk, or the like, the points or spikes 30 would, over a period of time, effectively move back toward the head 14 of the fastener 10, as may best be appreciated from FIG. 5, with a consequent loss of the clamping loading.

Figure 1:
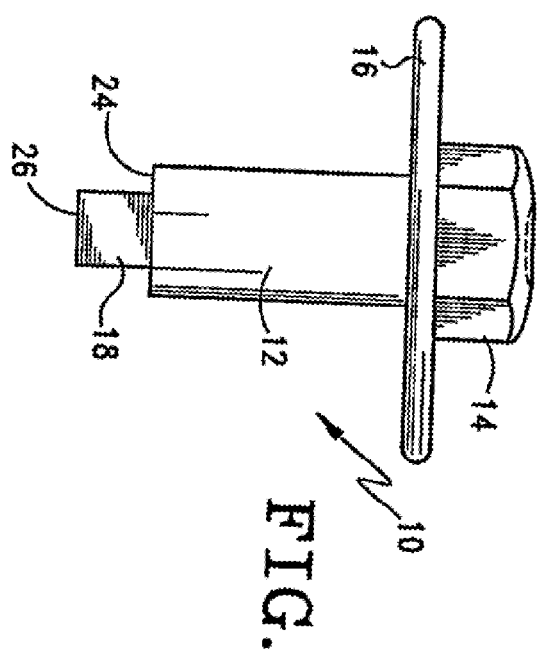
FIG. 1 is a side elevational view of a first embodiment of a quarter turn fastener, without its associated blade member attached thereto, constructed in accordance with the teachings and principles of the present invention.

With reference now being made to FIGS. 6–9, a second embodiment of a quarter turn fastener, constructed in accordance with the teachings and principles of the present invention, is disclosed and is generally indicated by the reference character 110. It is to be appreciated at this juncture that those component parts of the quarter turn fastener 110, which are similar or correspond to those component parts of the quarter turn fastener 10 shown in FIGS. 1, 2, and 5, are designated by similar or corresponding reference characters except that the reference characters will be within the 100 series. Accordingly, it is further appreciated that the quarter turn fastener 110 comprises an annular flange portion 116 and a head 114 which is formed with a substantially domed configuration which extends downwardly and radially outwardly so as to integrally blend into the annular flange portion 116. As best seen from FIGS. 6–8, the head 114 is provided with a centrally located X-shaped recessed portion 115 by means of which, in lieu of the hexagonally shaped head 14 of the quarter turn fastener 10, the quarter turn fastener 110 may be rotated by a suitable screwdriver or similar tool through means of a 90° arcuate movement so as to dispose the fastener 110 in either one of its locked or unlocked states, modes or positions.

As was the case with the quarter turn fastener 10, the quarter turn fastener 110 also comprises a shaft portion 112 and a tip portion 118, however, in addition to such noted structural components, the undersurface of the annular flange portion 116 is preferably provided with a suitable sealing element 131, such as, for example, rubber, plastisol, a hot melt adhesive, or the like, such that when the quarter turn fastener 110 is mounted within the apertures defined within the plurality of panels, plates, disks, or the like, so as to clamp the same together, water or other liquids, dirt, debris, or the like, is effectively prevented from migrating toward the fastener shaft 112 in order to prevent corrosion of the fastener 110. Still further, in accordance with a particularly unique feature of the present invention, the quarter turn fastener 110 further comprises a combination cam-stop member 132 which is integrally formed upon the quarter turn fastener 110 whereby the cam-stop member 132 is effectively axially interposed between the annular flange portion 116 and the upper end of the fastener shaft portion 112. As viewed from a plan point of view, and as can be appreciated either from FIG. 6 or FIG. 9, the cam-stop member 132 has a substantially rectangular configuration wherein the oppositely disposed, longitudinally extending sides 134 taper toward the oppositely disposed transversely extending ends 136. The cam-stop member 132 has a longitudinal axis 137. The significance of the cam-stop member 132 is that the same operatively and structurally cooperates with a uniquely configured aperture, defined within one of the plurality of panels, plates, disks, or the like to be clamped together by means of the quarter turn fastener 110, so as to effectively center the longitudinal axis of the quarter turn fastener 110 with respect to the axis of such aperture defined within the panel, plate, disk, or the like, and in addition, to prevent arcuate rotation of the quarter turn fastener 110 beyond an arcuate extent of 90° when the quarter turn fastener 110 is being moved either from its unlocked or disengaged position to its locked or engaged position, or from its locked or engaged position to its unlocked or disengaged position. In this manner, that is, as a result of such specifically defined states or positions, the quarter turn fastener 110 of the present invention cannot be inadvertently rotated beyond the particularly desired state or position so as to be undesirably and unexpectedly disposed in the opposite state or position.

More particularly, with reference being additionally made to FIG. 15, it is seen, for example, that a first one of the plurality of panels, plates, disks, or the like, designated by the reference character 138, is provided with a centrally located aperture 140 which has a substantially rectangular configuration and a longitudinal axis 141. The plate or panel 138 is adapted to be the lowermost one of the plurality of panels, plates, disks, or the like to be clamped together, and the quarter turn fastener 110 is adapted to have a blade member such as that shown at 20 in FIG. 3 mounted thereon wherein the blade member 20 has a longitudinal axis as designated at 21. When the blade member 20 is mounted upon the tip portion 118 of the quarter turn fastener 110, the longitudinal axes 137 and 21 of the cam-stop member 132 and blade member 20 are coaxially aligned with respect to each other. Accordingly, when the quarter turn fastener 110, having the blade member 20 mounted thereon, is inserted through the panels, plates, disks, or the like to be clamped together, the blade member 20 will have its longitudinal axis 21 aligned with the longitudinal axis 141 of the aperture 140 such that the blade member 20 can project through the aperture 140 of the plate or panel 138. Accordingly, when the quarter turn fastener 110 is then subsequently rotated through an arcuate extent of 90°, the blade member 20 can engage the undersurface of the plate or panel 138 so as to clamp the plurality of plates, panels, disks, or the like together.

With reference being additionally made to FIG. 16, a second one of the plurality of plates, panels, disks, or the like to be clamped together by means of the quarter turn fastener of the present invention is disclosed and is indicated by the reference character 142. Second plate or panel 142 is adapted to be interposed between the first panel or plate 138 and the annular flange portion 116 of the quarter turn fastener 10. As was the case with the first panel or plate 138, second panel or plate 142 is provided with a substantially centrally located aperture 144, however, as is clearly appreciated from FIG. 16, aperture 144 has a unique shape or configuration. More particularly, aperture 144 is defined by means of a pair of parallel end walls 146 which are disposed opposite from each other along a longitudinal axis 148 of the aperture 144, and a pair of longitudinally offset, parallel walls 150 which are disposed upon opposite sides of the axis 148. A third pair of longitudinally offset, substantially parallel walls 152 are also disposed upon opposite sides of the axis 148 and extend transversely with respect to the axis 148. Lastly, a pair of arcuate walls 154 interconnect a respective one of the walls 152 with a respective one of the walls 146. The distance defined between end walls 146 is just slightly larger than the longitudinal length dimension of the cam-stop member 132, and similarly for the distance defined between diametrically opposite points defined along the arcuate walls 154.

The axial extent or depth dimension of the cam-stop member 132 is somewhat less than the thickness of the second plate or panel 142, and accordingly, when the quarter turn fastener 110 is inserted through the first and second panels or plates 138,142, the cam-stop member 132 will not engage the first panel or plate 138 or the aperture 140 defined therein. To the contrary, the cam-stop member 132 will only operatively interact and engage the various side walls forming the aperture 144 within the second plate or panel 142. More particularly, when the first and second plates or panels 138,142 are to be clamped together, they are arranged such that the longitudinal axes 141,148 of the apertures 140,144 are coaxially aligned with respect to each other. As a result of such relative disposition of the first and second plates or panels 138,142, when the quarter turn fastener 110 is inserted through the plates or panels 138,142, the longitudinal axis 21 of the blade member 20 will be aligned with the longitudinal axis 141 of the aperture 140 such that the blade member 120 can pass through the aperture 140 of the first plate or panel 138 so as to be disposed beneath the undersurface of the lower panel or plate member 138. In a similar manner, the longitudinal axis 137 of the cam-stop member 132 is aligned with the longitudinal axis 148 of the aperture 144 of the second plate or panel 142 such that each one of the ends 136,136 of the cam-stop member 132 is disposed adjacent to a respective one of the oppositely disposed walls 146,146, and diagonally opposite ones of the sides 134,134 are similarly disposed adjacent to respective ones of the walls 150,150 of the plate or panel 142. The quarter turn fastener 110 is therefore disposed at its unlocked or released position with respect to the panels or plates 138, 142.

When the panels or plates 138,142 are to be clamped or secured togther, the quarter turn fastener 110 is rotated 90° in the clockwise direction as viewed in FIG. 16 such that the oppositely disposed ends 136,136 of the cam-stop member 132 effectively move in a guided manner along the arcuate walls 154,154 of the plate or panel 142 until diagonally opposite ones of the sides 134,134 of the cam-stop member 132 encounter or engage the walls 152,152 of the panel or plate 142. While the oppositely disposed ends 136, 136 of the cam-stop member 132 are being guided along the arcuate walls 154,154 of the plate or panel 142, the walls 154,154 together effectively cam the cam-stop member 132 such that the quarter turn fastener 110 is always maintained centered within and with respect to the aperture 144. In addition, as a result of the engagement or contact of the diagonally opposite sides 134,134 of the cam-stop member 132 with the walls 152,152 of the plate or panel 142, rotation of the quarter turn fastener 110 beyond the 90° arcuate rotation is prevented. Consequently, the quarter turn fastener 110 has achieved its locked or engaged position whereby the panels or plates 138,142 are securely clamped together.

It is to be especially appreciated that as a result of the particular configuration of the aperture 144, and the provision of the walls 152,152, the quarter turn fastener 110 cannot be rotated beyond the 90° locked or engaged position such that the quarter turn fastener 110 cannot be over-rotated through an angular extent, for example, of 180°, back to its original unlocked or disengaged position. In a similar manner, when the quarter turn fastener 110 is intentionally to be moved from its locked or engaged position to its unlocked or disengaged position whereby the panels or plates 138,142 can be released and unclamped, the fastener 110 is rotated 90° in the counterclockwise direction until diagonally opposite sides 134,134 of the cam-stop member 132 respectively encounter or contact the walls 150,150 of the plate or panel 142. During such counterclockwise rotational movement of the quarter turn fastener, the arcuate walls 154,154 maintain the quarter turn fastener 110 centered within and with respect to the aperture 144 in a manner similar to that achieved during the aforenoted clockwise rotation of the quarter turn fastener 110, and as a result of the encounter or contact of the sides 134,134 of the cam-stop member 132 with the walls 150,150 of the plate or panel 142, further counterclockwise rotation of the quarter turn fastener 110 is prevented and the quarter turn fastener 110 is now disposed at its original unlocked or disengaged position.

It is to be additionally appreciated that not only do the walls 150,150 obviously prevent further rotation of the quarter turn fastener 110 in the counterclockwise direction beyond the unlocked or disengaged position as has just been described, but in addition, walls 150,150 prevent free rotation of the quarter turn fastener 110 in the counterclockwise direction. If this were not the case, then the quarter turn fastener 110 could be rotated in the counterclockwise direction from its unlocked or disengaged state or position to its locked or engaged state or position and even over-rotated beyond such locked or engaged state or position so as to undesirably and inadvertently achieve the unlocked or disengaged state or position. It is therefore to be understood that with the structure of the quarter turn fastener 110, rotational movements of the quarter turn fastener 110 are limited or confined to a maximum extent of 90° between the walls 150,150 and the walls 152,152. In particular, the quarter turn fastener 110 can never be rotated in the clockwise direction, when the quarter turn fastener 110 is initially disposed in the locked or engaged position or state, so as to move the quarter turn fastener 110 to the unlocked or disengaged position or state, and similarly, the quarter turn fastener 110 can never be rotated in the counterclockwise direction, when the quarter turn fastener 110 is initially disposed in the unlocked or disengaged position or state, so as to move the quarter turn fastener 110 to the locked or engaged position or state. It is therefore apparent that with the structure uniquely characteristic of the quarter turn fastener 110 of the present invention, both the locked or engaged state or position, as well as the unlocked or disengaged state or position, are precisely defined.

With reference now being made to FIGS. 10–12, a second embodiment of a blade member, which may be used in connection with either one of the quarter turn fasteners 10 and 110 disclosed within FIGS. 1–2 and 6–9, is disclosed and is generally indicated by the reference character 120. The blade member 120 is seen to be substantially the same as the blade member 20 shown in FIG. 3, however, the difference between the two blade members 20,120 resides in the manner in which the finalized blade members 20,120 are fabricated. More particularly, in lieu of the corner regions 28 being simply upturned such that the corners 30 then define upstanding or upwardly extending points or spikes, each one of a pair of diagonally opposed corner regions 128 are bent upwardly around a first bend line 123 such that a portion of the corner region 128 defines a substantially upwardly extending inclined wall portion 125. Each corner region 128 is then bent again around a second bend line 127 such that a horizontally disposed corner surface region 129 is formed so as to be disposed substantially parallel to the plane of the main body portion 117 of the blade member 120 and for engaging the undersurface portion of the lowermost one of the panels, plates, disks, or the like in order to clampingly secure the plates, panels, disks, or the like together when the quarter turn fastener is rotated to its locked or engaged position. In view of the fact that a substantially flat or horizontally disposed surface 129 is engaged with the undersurface portion of the lowermost one of the panels, plates, disks, or the like to be secured together by means of the quarter turn fastener, as opposed to the spikes or points 30 of the blade member 20 as shown in FIGS. 3–4, the quarter turn fastener having the blade member 120 mounted thereon can be repetitively or cyclically removed and installed upon the panels, plates, disks, or the like without causing any substantial damage to the panels, plates, disks, or the like as would be the case with the blade member 20 as has been noted hereinbefore.

Referring now to FIGS. 13 and 14, a third embodiment of a blade member, which is constructed in accordance with the principles and teachings of the present invention and which may be used in conjunction with either one of the quarter turn fasteners 10,110, is disclosed and is generally indicated by the reference character 220. In accordance with the structure of this particular embodiment of the blade member, in order to achieve plate or panel contact members somewhat similar to those designated at 129 in connection with the second embodiment of the blade member 120 as shown in FIGS. 10–12, diagonally opposite corner regions 228 of the blade member 220 are initially partially severed or cut along lines 219 oriented perpendicular to the longitudinal axis 221 of the blade member 220, and such cut or severed corner regions 228 are then bent upwardly around a first bend line 223 so as to effectively form upstanding wall members 225. The upstanding wall members 225 are then bent around a second bend line 227 so as to form horizontally disposed surface members 229 which extend in opposite directions with respect to each other, that is, they extend outwardly away from the axis 221 of the blade member 220. Surface members 229 are also disposed substantially parallel to the plane of the main body portion 217 of the blade member 220 and are adapted to engage the undersurface of the lowermost panel or plate member of the panels, plates, disks, or the like being secured together by means of either one of the quarter turn fasteners 10,110.

With reference now being additionally made to FIG. 17, a third embodiment of a quarter turn fastener, constructed in accordance with the principles and teachings of the present invention, is disclosed and is generally indicated by the reference character 210. It is to be appreciated that the quarter turn fastener 210 of FIG. 17 is similar to the quarter turn fastener 110 shown, for example, in FIGS. 6–9 with the primary difference residing in the configuration of the cam-stop member 132. More particularly, as opposed to the substantially rectangularly configured cam-stop member 132 having the tapered sides 134 and ends 136, the cam-stop member 232 has a configuration which is substantially that of a rhombus having sides 234 and corners 236. Other than such structural or configurational difference, it is noted that the quarter turn fastener 210 is substantially similar, and operates in a similar manner, to that of the quarter turn fastener 110 disclosed within FIGS. 6–9.

With reference now being made to FIGS. 18 and 19, a fourth embodiment of a blade member constructed in accordance with the principles and teachings of the present invention is disclosed and is generally indicated by the reference character 320. The blade member 320 may be used, for example, in conjunction with the quarter turn fastener 10 disclosed within FIGS. 1 and 2, however, it is to be appreciated that the blade member 320 is quite different from the blade members 20,120, and 220, respectively disclosed, for example, within FIGS. 3, 10, and 13, in that the blade member 320 not only serves to clamp the metal and plastic plates or members together, but in addition, has integrally incorporated thereon stop members for preventing rotation of the quarter turn fastener beyond, for example, approximately 90° in either direction, that is, from the unlocked or unclamped state to the locked or clamped state, or alternatively from the locked or clamped state to the unlocked or unclamped state.

More particularly, it is seen that the blade member 320 comprises a uniquely configured member which includes a substantially rectangularly shaped base portion 360, and a substantially square-shaped aperture 322 is defined within a substantially central region of the base portion 360. A pair of raised portions 362,364 are disposed within elevated planes which are parallel to the plane of the base portion 360 whereby the raised portions 362,364 extend along the opposite longitudinal sides 366,368 of the rectangular base portion 360, and a pair of diagonally opposed sloped sections 370,372 integrally interconnect the oppositely disposed raised portions 362,364 to the opposite lateral sides 374,376 of the rectangular base portion 360. The free end portions of the elevated sections 362,364 are respectively provided with a pair of upstanding or upwardly projecting tab members 378,380, and it is therefore seen that the tab members 378,380 extend substantially perpendicular to the planes of the elevated sections 362,364.

The blade member 320 disclosed within FIGS. 18 and 19 is adapted to be used in conjunction with a quarter turn fastener such as that disclosed, for example, within FIGS. 1 and 2 as at 10, and in addition, is also adapted to be used in conjunction with metal and plastic disks, panels, plates, or the like similar to those disclosed within FIGS. 15 and 16 as at 138 and 142 so as to clampingly secure the same together. When using the blade member 320 in conjunction with the quarter turn fastener 10 and plates or panels similar to the first and second plates or panels 138, 142 disclosed within FIGS. 15 and 16, it is to be noted that while a first metal plate or panel similar to plate or panel 138 may be employed, the second plastic panel or plate need not be similar to second plate or panel 142 in that there is no need to provide a plate or panel having the uniquely configured aperture 144 defined therein in order to achieve the 90° rotational stop operation. The reason for this is that in lieu of the 90° rotational stop operation being a function of the interengaging surfaces formed upon, for example, the quarter turn fasteners 110,210, shown respectively in FIGS. 6–9 and 17, and the side walls of the aperture 144 formed within the plate 142, the 90° rotational stop operation is achieved by means of the tab members 378, 380 formed upon the blade member 320 interengaging side walls of an aperture formed within a first plate or panel similar to the first plate or panel 138.

More particularly, as best seen in FIG. 20, a first metal plate or panel is disclosed at 338 and is adapted to be clampingly secured together with a second plastic plate or panel, not shown. The second plastic plate or panel, not shown, can be similar to second plastic plate or panel 142 disclosed within FIG. 16, however, in lieu of the uniquely configured aperture 144 formed within second plate or panel 142, the second plate or panel, not shown, to be used in conjunction with first metal plate or panel 338 may simply have a circular aperture formed within the central portion thereof wherein the diametrical extent of the circular aperture is large enough to permit the blade member 320 to be inserted therethrough. The first metal plate or panel 338 is similar to the first metal plate or panel 138 shown in FIG. 15 and is accordingly provided with a substantially rectangular aperture 340. Consequently, when the first and second metal and plastic plates or panels are to be secured together, the blade member 320, which is fixedly secured upon the distal end 326 of the quarter turn fastener shank, is inserted through both of the apertures respectively formed within the first and second metal and plastic panels or plates, and subsequently, the quarter turn fastener is rotated in the counterclockwise direction as denoted by means of the arrow CCW shown in FIG. 20. As a result of the counterclockwise rotation of the quarter turn fastener, the inclined or sloped portions 370,372 of the blade member 320 initially engage and subsequently overlap the longitudinal sides 341,343 of the rectangular aperture 340 as illustrated so as to impress biasing clamping forces upon the first metal plate 338 whereby the first metal plate 338 is forced into clamped contact with the second plastic plate, not shown, and subsequently, diametrically opposite corner regions 382,384 of the tab members 378,380 will engage the inner edge portions of the longitudinal sides 341,343 of the aperture 340 so as to prevent further rotation of the quarter turn fastener. As can be appreciated from FIG. 20, in accordance with this embodiment of the quarter turn fastener as employed in conjunction with the first and second metal and plastic plates, the quarter turn fastener actually undergoes a maximum counterclockwise rotation of approximately 65° when moving from the unlocked or unclamped state to the locked or clamped state. In a similar manner, when the quarter turn fastener is to be removed from the plates or panels so as to release the plates or panels from each other, clockwise rotation of the quarter turn fastener from the illustrated state to the unlocked or unclamped state is permitted until tab members 378,380 respectively encounter the inner edge portions of the longitudinal sides 343,341 of the aperture 340.

Figure 21:
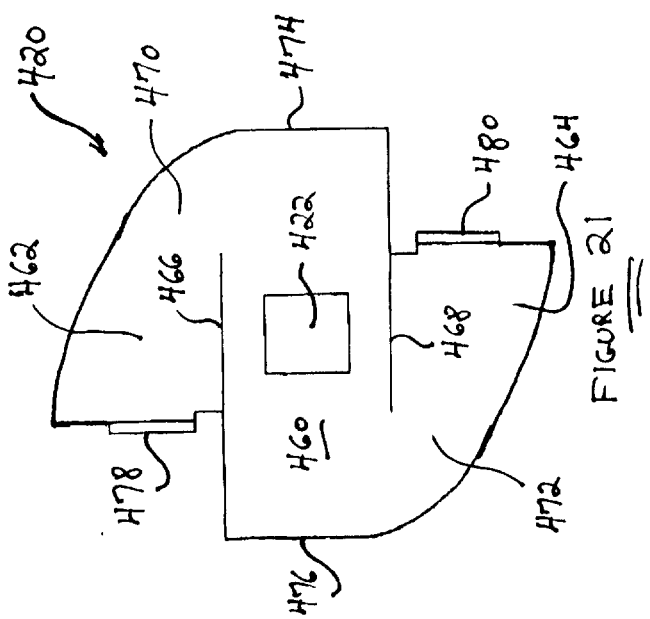
FIG. 21 is a top plan view similar to that of FIG. 18 showing, however, a fifth embodiment of a blade member constructed in accordance with the principles and teachings of the present invention and useable with, for example, the quarter turn fastener as shown in FIGS. 1 and 2.

With reference lastly now being made to FIGS. 21 and 22, a fifth embodiment of a blade member constructed in accordance with the principles and teachings of the present invention is disclosed and is generally indicated by the reference character 420. It is to be noted that the fifth embodiment blade member 420 has substantially the same structure and operative function as those of the fourth embodiment blade member 320, except as noted hereinafter, and consequently, a detailed description of the structure, and operation of the fifth embodiment blade member 420 with respect to the first and second metal and plastic plates or panels, will not be described. It is also noted that component parts of the fifth embodiment blade member 420, as well as those of the first metal plate 438, are denoted by reference characters which are similar to those employed in conjunction with the fourth embodiment blade member 320 and plate or panel member 338, except that the reference characters for the blade member 420 and plate or panel member 438 are within the 400 series. Accordingly, it is to be noted that the only significant difference between the fourth and fifth embodiment blade members 320,420 resides in the fact that the raised or elevated portions 462,464 of the blade member 420 are in effect extended laterally outwardly so as to effectively form or define eared portions 486,488 which actually overlap the longitudinal sides 441,443 of the aperture 440 formed within the plate or panel 438 when the quarter turn fastener is rotated to the locked or clamped state as illustrated in FIG. 22. In this manner, the tab members 478,480 are in effect disposed laterally inwardly whereby the quarter turn fastener is now in fact permitted to undergo approximately a maximum 90° rotation in the counterclockwise direction when being rotated from the unlocked or unclamped state to the locked or clamped state with respect to the metal and plastic plates or panels. As was the case with the fourth embodiment blade member 320, the corner portions 482,484 of the tab members 478,480 engage the inner edge portions 441, 443 of the aperture 440 of the plate or panel 438 so as to prevent over-rotation of the quarter turn fastener.

Thus, it may be seen that in accordance with the teachings and principles of the present invention, a first embodiment of the quarter turn fastener may be provided with a blade member which enhances the clamping loading of the fastener and which is specifically designed or intended to be used only for substantially permanent installations. In addition, the shank portions and blade members of the quarter turn fasteners of the other embodiments of the invention are provided with cam-stop and tab-stop members which prevent rotation of the quarter turn fasteners through arcuate extents which are greater than 90° so as to specifically define the locked and unlocked positions of the quarter turn fasteners and prevent unintentional movement of locked fasteners to unlocked positions.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A quarter turn fastener adapted to be rotated through an arcuate extent of up to approximately 90° between an unlocked state and a locked state and to be installed upon at least two members so as to secure the at least two members together, comprising:

a shaft member;

a flange portion mounted upon a first end of said shaft member for engaging a first one of the at least two members; and a blade member having a central aperture defined therein for enabling said blade member to be mounted upon a second opposite end of said shaft member so as to engage a second one of the at least two members, and comprising a substantially planar base member disposed within a first plane and having a substantially rectangular configuration, a pair of sloped camming members disposed upon opposite sides of said substantially planar base member and extending from first end portions disposed within said first plane to second end portions disposed within a second plane disposed substantially parallel to said first plane wherein said second end portions are oriented toward said flange portion for biasingly engaging wall portions of a second one of the at least two members to be secured together so as to effectively force the at least two members together as said quarter turn fastener is rotated through an arcuate range of up to approximately 90° from said unlocked state to said locked state.

2. The quarter turn fastener as set forth in claim 1, wherein:

said blade member comprises substantially sharply pointed structure for engaging and biting into the second one of the at least two members so as to substantially prevent retrograde movement of said quarter turn fastener from said locked state back to said unlocked state after said quarter turn fastener has been mounted upon the at least two members and rotated substantially 90° from said unlocked state to said locked state whereby said quarter-turn fastener will be substantially permanently installed upon the at least two members.

3. The quarter turn fastener as set forth in claim 2, further comprising:

structure integral with said flange portion for enabling rotation of said quarter turn fastener by a torquing tool.

4. The quarter turn fastener as set forth in claim 3, wherein:

said structure integral with said flange portion comprises a geometrically configured head for engagement by a wrench tool.

5. The quarter turn fastener as set forth in claim 3, wherein:

said structure integral with said flange portion comprises a recessed portion for engagement by a screwdriver tool.

6. The quarter turn fastener as set forth in claim 2, wherein:

said sharply pointed structure comprises corner regions of said substantially rectangular blade member bent out of said first plane of said substantially planar blade member so as to extend toward said flange portion of said fastener and be disposed within said second plane.

7. The quarter turn fastener as set forth in claim 6, wherein:

said blade member has a longitudinal axis; and said bent corner regions comprise diagonally opposite corner regions disposed upon opposite sides of said longitudinal axis.

8. The quarter turn fastener as set forth in claim 1, further comprising:

a stop member mounted upon one of said shaft and blade members for engaging at least one wall portion of one of the at least two members to be secured together so as to substantially limit the movement of said quarter turn fastener through an arcuate range of up to approximately 90° from said unlocked state to said locked state and through an arcuate range of up to approximately 90° from said locked state to said unlocked state.

9. The quarter-turn fastener as set forth in claim 8, wherein:

said stop member comprises a pair of stop members respectively mounted upon said second end portions of said pair of sloped camming members of said blade member which are disposed within said second plane and at diagonally opposite corner regions of said blade member for engaging the wall portions of the one of the at least two members to be secured together so as to substantially limit the movement of said quarter turn fastener through an arcuate range of up to approximately 90° as said quarter turn fastener is moved from said unlocked state to said locked state and through an arcuate range of up to approximately 90° as said quarter turn fastener is moved from said locked state to said unlocked state.

10. The quarter turn fastener as set forth in claim 8, wherein:

said stop member is mounted upon said shaft member at an axial position adjacent to said flange portion for engaging at least one wall portion of a first one of the at least two members to be secured together.

11. The quarter turn fastener as set forth in claim 8, wherein:

said stop member has a substantially rectangular cross-sectional configuration.

12. The quarter turn fastener as set forth in claim 10, wherein:

said stop member has a cross-sectional configuration which is substantially that of a rhombus.

13. In combination, a fastener assembly, comprising:

a plurality of members to be secured together; and a quarter turn fastener adapted to be rotated through an arcuate extent up to approximately 90° between an unlocked state and a locked state and installed upon said plurality of members so as to secure said plurality of members together, said quarter turn fastener comprising a shaft member; a flange portion mounted upon a first end of said shaft member for engaging a first one of said plurality of members to be secured together; and a blade member having a central aperture defined therein for enabling said blade member to be mounted upon a second opposite end of said shaft member so as to engage a second one of said plurality of members to be secured together, and comprising a substantially planar base member disposed within a first plane and having a substantially rectangular configuration, a pair of sloped camming members disposed upon opposite sides of said substantially planar base member and extending from first end portions disposed within said first plane to second end portions disposed within a second plane disposed substantially parallel to said first plane wherein said second end portions are oriented toward said flange portion for biasingly engaging wall portions of a second one of said plurality of members to be secured together so as to effectively force said plurality of members together as said quarter turn fastener is rotated through an arcuate range of up to approximately 90° from said unlocked state to said locked state.

14. The combination as set forth in claim 13, wherein:
said blade member comprises substantially sharply pointed structure for engaging and biting into said second one of said plurality of members to be secured together so as to substantially prevent retrograde movement of said quarter turn fastener from said locked state back to said unlocked state after said quarter turn fastener has been mounted upon said plurality of members to be secured together and rotated substantially 90° from said unlocked state to said locked state whereby said quarter-turn fastener will be substantially permanently installed upon said plurality of members to be secured together such that said plurality of members are substantially permanently secured together.

15. The combination as set forth in claim 14, wherein:
said sharply pointed structure comprises corner regions of said substantially rectangular blade member bent out of said first plane of said substantially planar blade member so as to extend toward said flange portion of said fastener and be disposed within said second plane.

16. The combination as set forth in claim 13, further comprising:
a stop member mounted upon one of said shaft and blade members for engaging at least one wall portion of one of said plurality of members to be secured together so as to substantially limit movement of said quarter turn fastener through an arcuate extent of up to approximately 90° from said unlocked state to said locked state and through an arcuate extent of up to approximately 90° from said locked state to said unlocked state.

17. The combination as set forth in claim 16, wherein:
said stop member is mounted upon said shaft member of said quarter turn fastener at an axial position adjacent to said flange portion.

18. The combination as set forth in claim 16, wherein:
said substantially rectangular blade member has oppositely disposed ends and oppositely disposed sides;
said second one of said plurality of members to be secured together has an aperture defined therein having a substantially rectangular configuration so as to permit said substantially rectangular blade member to pass therethrough; and
said first one of said plurality of members to be secured together has an aperture defined therein wherein said at least one wall portion of said first one of said plurality of members to be secured together comprises a first wall member for engaging said stop member when said quarter turn fastener is rotated through said arcuate extent of up to approximately 90° from said unlocked state to said locked state, and a second wall member for engaging said stop member when said quarter turn fastener is rotated through said arcuate extent of up to approximately 90° from said locked state to said unlocked state.

19. The combination as set forth in claim 16, wherein:
said stop member has a substantially rectangular cross-sectional configuration.

20. The combination as set forth in claim 16, wherein:
said stop member has a cross-sectional configuration which is substantially that of a rhombus.

21. The combination as set forth in claim 16, further comprising:
structure integral with said flange portion for enabling rotation of said quarter turn fastener by a torquing tool.

22. The combination as set forth in claim 21, wherein:
said structure integral with said flange portion comprises a geometrically configured head for engagement by a wrench tool.

23. The combination as set forth in claim 21, wherein:
said structure integral with said flange portion comprises a recessed portion for engagement by a screwdriver tool.

24. The combination as set forth in claim 16, wherein:
said substantially rectangular blade member comprises oppositely disposed ends and oppositely disposed sides, and said stop member is defined as a pair of stop members respectively mounted upon said second end portions of said pair of sloped camming members of said blade member which are disposed within said second plane and at diagonally opposite corner regions of said blade member for engaging said second one of said plurality of members to be secured together;
said first one of said plurality of members to be secured together has an aperture defined therein having a substantially circular configuration so as to permit said substantially rectangular blade member to pass therethrough; and
said second one of said plurality of members to be secured together has a substantially rectangular aperture defined therein wherein said at least one wall portion of said second one of said plurality of members to be secured together comprises a first wall member for engaging said stop members when said quarter turn fastener is rotated through said arcuate extent of up to approximately 90° from said unlocked state to said locked state, and a second wall member for engaging said stop members when said quarter turn fastener is rotated through said arcuate extent of up to approximately 90° from said locked state to said unlocked state.

25. The combination as set forth in claim 24, wherein:
said pair of stop members comprises a pair of tab members extending perpendicular to planar portions of said blade member; and
said first and second wall members of said second one of said plurality of members to be secured together comprise opposite inner edge portions of said substantially rectangular aperture formed within said second one of said plurality of members to be secured together.

26. The combination as set forth in claim 13, wherein:
diagonally opposite corner regions of said substanitally rectangular blade member comprise double-bend portions forming engagement portions disposed substantially parallel to said first plane of said blade member and for engaging said second one of said plurality of members.

* * * * *

UNITED STATES PATENT AND TRADEMARK OFFICE
CERTIFICATE OF CORRECTION

| | | |
|---|---|---|
| PATENT NO. | : 6,575,682 B1 | |
| APPLICATION NO. | : 09/716144 | |
| DATED | : June 10, 2003 | |
| INVENTOR(S) | : Dohm et al. | |

It is certified that error appears in the above-identified patent and that said Letters Patent is hereby corrected as shown below:

The title page should be deleted to appear as per attached title page.

The sheets of drawings consisting of figures 1-22 should be deleted to appear as per attached figures 1-22.

Claim, 11 column 14, line 50 change claim 8 to claim 10.

Signed and Sealed this

Twenty-fifth Day of September, 2007

JON W. DUDAS
*Director of the United States Patent and Trademark Office*

United States Patent
Dohm et al.

(10) Patent No.: US 6,575,682 B1
(45) Date of Patent: Jun. 10, 2003

(54) QUARTER TURN FASTENER

(75) Inventors: Stephen R. Dohm, Schaumburg, IL (US); Jeffrey D. Anderson, South Elgin, IL (US); Jennifer L. Crumrine, Streamwood, IL (US); James M. Van Ingen, Algonquin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/716,144

(22) Filed: Nov. 16, 2000

(51) Int. Cl.$^7$ .................................. F16B 21/02
(52) U.S. Cl. .................... 411/553; 411/349; 411/350; 411/84
(58) Field of Search .................... 411/349, 549–553, 411/84, 85; 292/59, 241

(56) References Cited

U.S. PATENT DOCUMENTS

| | | | |
|---|---|---|---|
| 890,285 A | * | 6/1908 | Krantz .................. 411/84 |
| 2,580,319 A | | 12/1951 | Poupitch |
| 2,670,513 A | | 3/1954 | Schlueter |
| 2,676,680 A | * | 4/1954 | Kindorf .................. 411/84 |
| 2,931,471 A | | 4/1960 | Howard |
| 3,123,389 A | | 3/1964 | Biesecker |
| 3,472,542 A | * | 10/1969 | Hart |
| 4,145,862 A | | 3/1979 | Sygnator |
| 4,262,394 A | * | 4/1981 | Wright |
| 4,545,697 A | * | 10/1985 | Verdenne |
| 4,936,066 A | * | 6/1990 | Rutsche |
| 5,142,834 A | * | 9/1992 | Laclave |
| 5,897,278 A | | 4/1999 | Frattarola |

FOREIGN PATENT DOCUMENTS

JP 3-39918 * 10/1992

* cited by examiner

*Primary Examiner*—Flemming Saether
(74) *Attorney, Agent, or Firm*—Mark W. Croll; Paul F. Donovan

(57) ABSTRACT

A quarter turn fastener, for securing a plurality of members together, includes a blade member which has upturned corner portions defining sharp points for bitingly engaging the undersurface of the lowermost one of the plurality of members so as to prevent retrograde movement of the quarter turn fastener from the locked state back to the unlocked state. A quarter turn fastener assembly also comprises a stop member for engaging wall portions of another one of the members to be secured together such that rotation of the quarter turn fastener is limited to 90° arcuate extents either from the unlocked state to the locked state or from the locked state to the unlocked state.

26 Claims, 5 Drawing Sheets

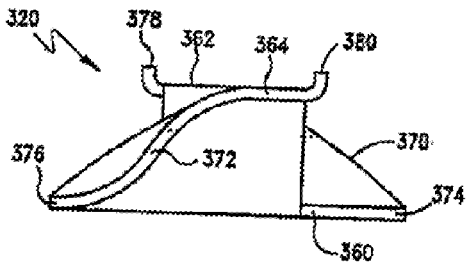
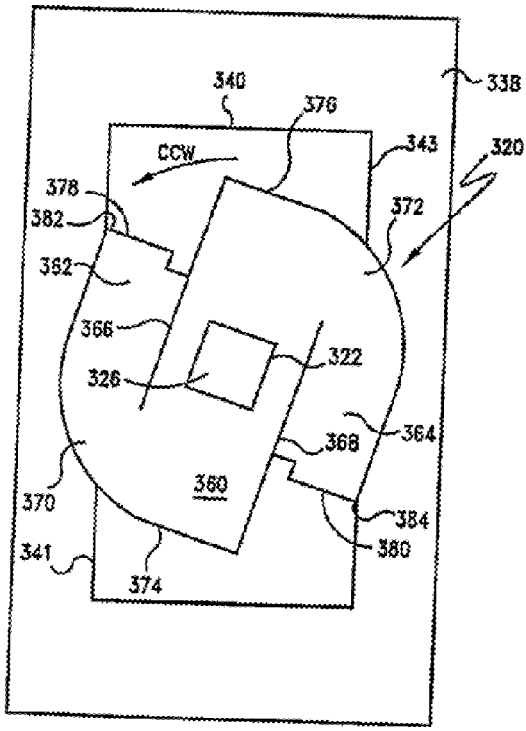

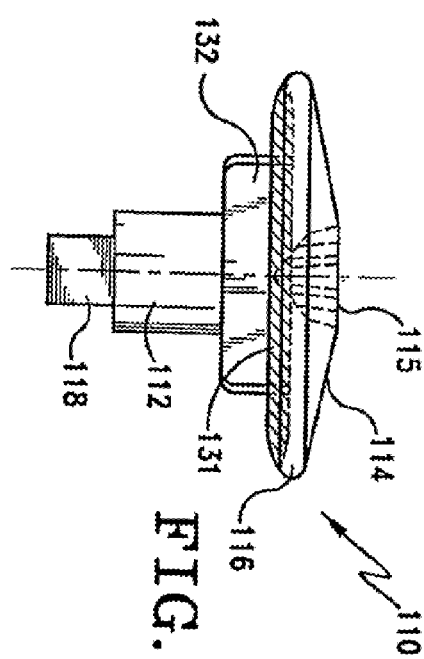
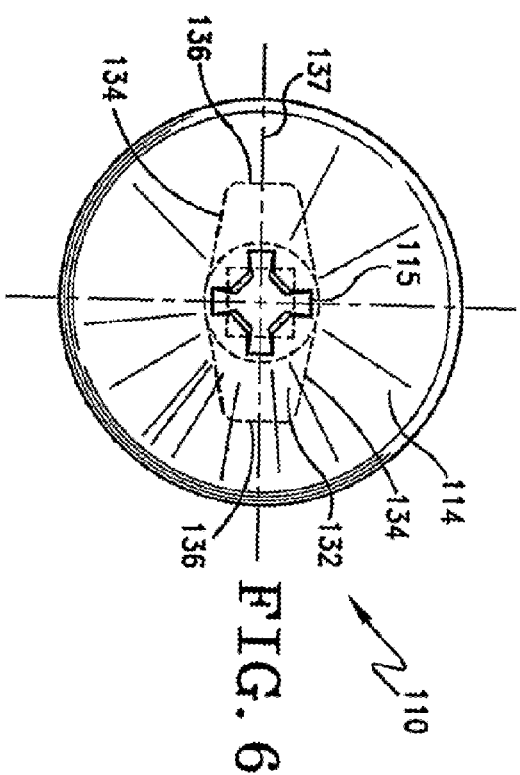
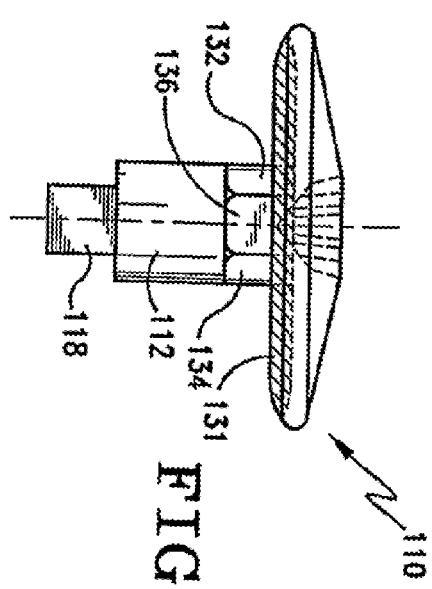
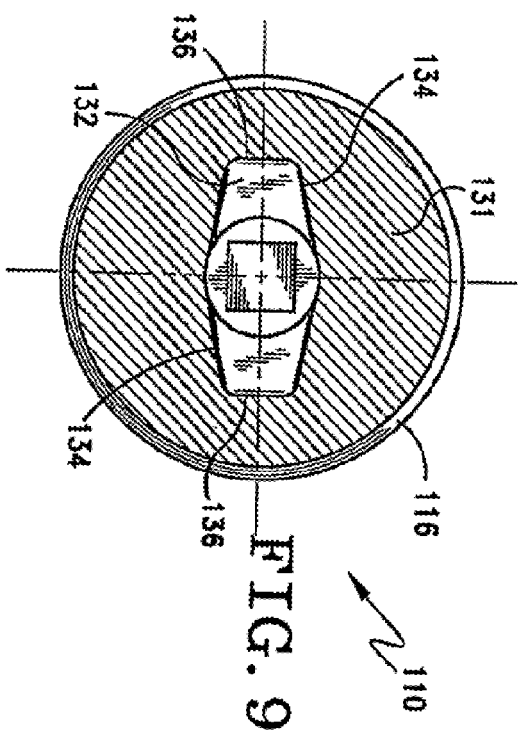

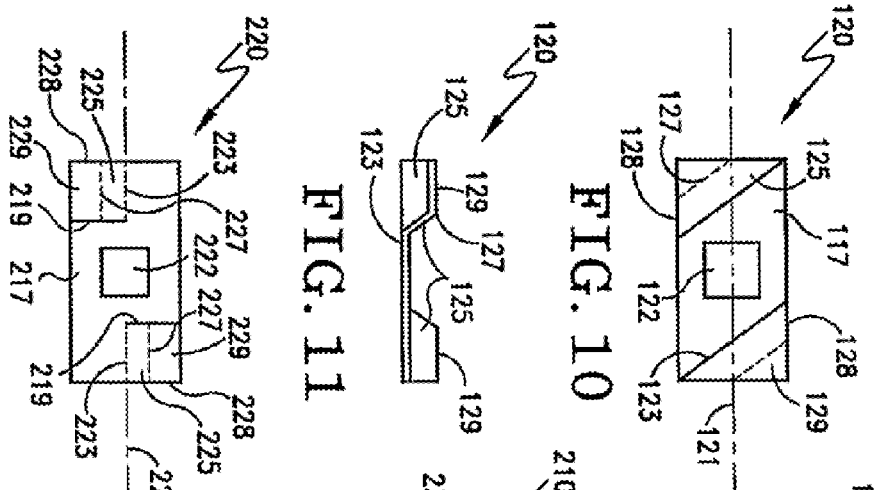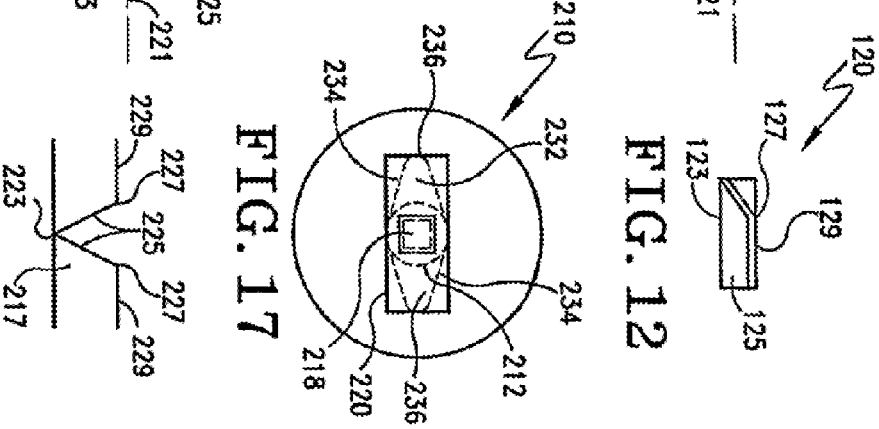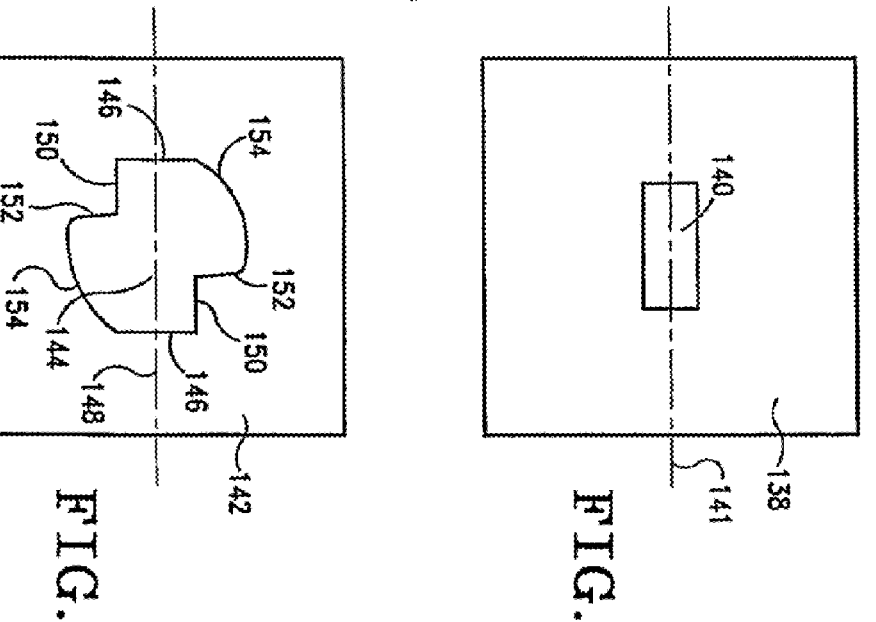

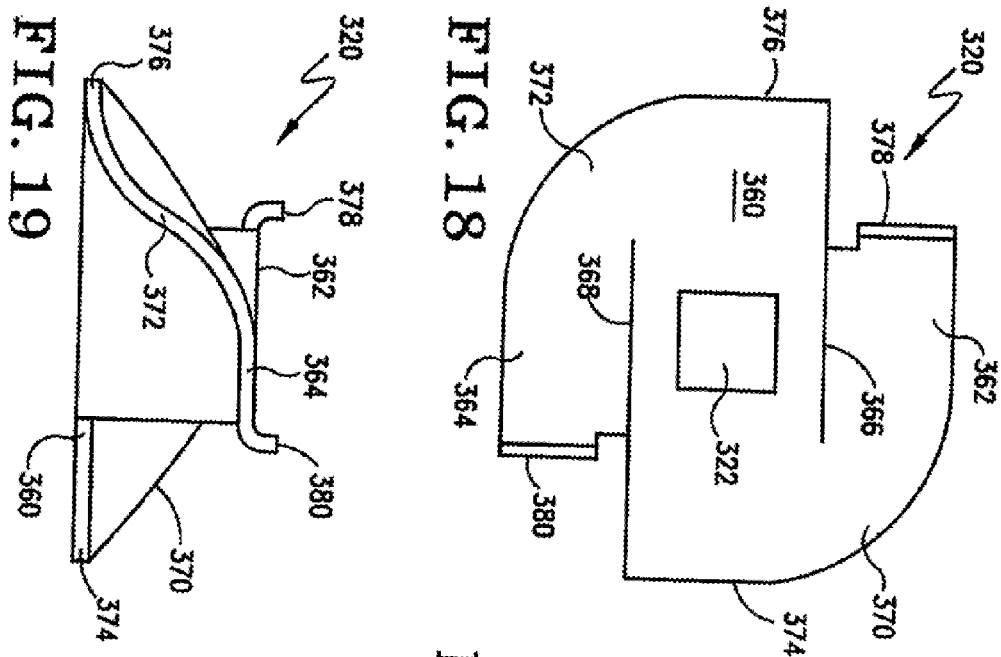
FIG. 18
FIG. 19
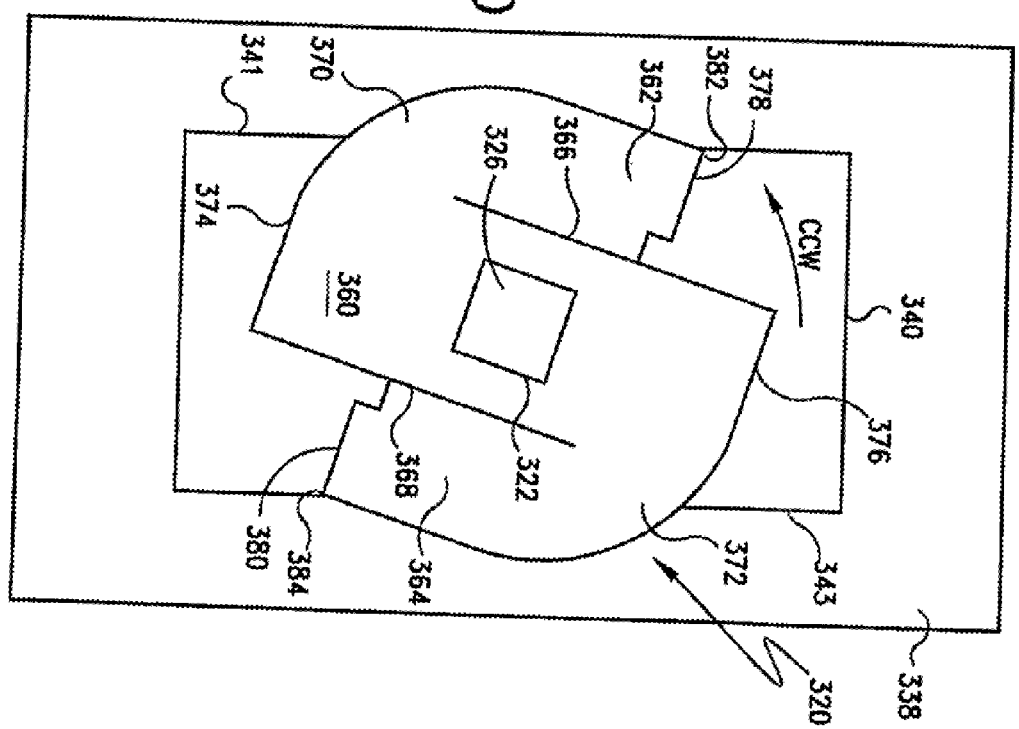
FIG. 20